United States Patent
Yu et al.

(10) Patent No.: US 12,487,325 B2
(45) Date of Patent: Dec. 2, 2025

(54) RADAR SENSOR SYSTEM, MODULATION APPARATUS AND METHOD

(71) Applicant: Robert Bosch GmbH, Stuttgart (DE)

(72) Inventors: Tianyi Yu, Suzhou (CN); Lifei Ren, Suzhou (CN)

(73) Assignee: Robert Bosch GmbH, Stuttgart (DE)

(*) Notice: Subject to any disclaimer, the term of this patent is extended or adjusted under 35 U.S.C. 154(b) by 422 days.

(21) Appl. No.: 18/156,763

(22) Filed: Jan. 19, 2023

(65) Prior Publication Data
US 2023/0324508 A1    Oct. 12, 2023

(30) Foreign Application Priority Data
Jan. 27, 2022   (CN) ......................... 202210099760.7

(51) Int. Cl.
| G01S 7/35 | (2006.01) |
| G01S 7/02 | (2006.01) |
| G01S 13/34 | (2006.01) |
| G01S 13/87 | (2006.01) |
| G01S 13/91 | (2006.01) |

(52) U.S. Cl.
CPC ............... *G01S 7/35* (2013.01); *G01S 13/87* (2013.01); *G01S 13/91* (2013.01); *G01S 7/02* (2013.01); *G01S 7/0235* (2021.05); *G01S 13/34* (2013.01)

(58) Field of Classification Search
CPC . G01S 7/35; G01S 13/87; G01S 13/91; G01S 7/0235; G01S 13/34; G01S 7/02
See application file for complete search history.

(56) References Cited

U.S. PATENT DOCUMENTS

| 10,928,498 B1* | 2/2021 | Li | H04W 64/00 |
| 2010/0103023 A1* | 4/2010 | Ogawa | G01S 13/931 |
|  |  |  | 342/70 |
| 2016/0155334 A1* | 6/2016 | Jansson | G08G 1/07 |
|  |  |  | 340/906 |
| 2021/0018588 A1* | 1/2021 | Akamine | G01S 7/411 |
| 2022/0035022 A1* | 2/2022 | Alliot | G01S 13/867 |
| 2023/0314588 A1* | 10/2023 | Hoffmann | G01S 13/878 |
|  |  |  | 342/59 |
| 2024/0288538 A1* | 8/2024 | Kishigami | G01S 7/0231 |

FOREIGN PATENT DOCUMENTS

WO    WO-2019145072 A1 *    8/2019 ............. G01S 13/87

\* cited by examiner

*Primary Examiner* — William Kelleher
*Assistant Examiner* — Ismaaeel A. Siddiquee
(74) *Attorney, Agent, or Firm* — Maginot, Moore & Beck LLP

(57) ABSTRACT

Provided in the present disclosure are a radar sensor system, and a modulation device and method thereof. The radar sensor system includes a plurality of groups of radar sensors, and each radar sensor has a serial number corresponding to an order thereof in the group. The modulation device is configured to perform modulation control on the plurality of groups of radar sensors, such that the radar sensors in the same group transmit radar signals by different time modulation and the radar sensors with the corresponding serial numbers in different groups transmit radar signals by the same time modulation.

18 Claims, 6 Drawing Sheets

RADAR SENSOR SYSTEM, MODULATION APPARATUS AND METHOD

This application claims priority under 35 U.S.C. § 119 to application no. CN 202210099760.7, filed on Jan. 27, 2022 in China, the disclosure of which is incorporated herein by reference in its entirety.

TECHNICAL FIELD

The present application relates to a radar sensor system based on time modulation, and a modulation device for such a radar sensor system and a corresponding modulation method.

BACKGROUND

Radar is often used as a roadside sensing device due to the advantage of being less affected by the environment and weather, and plays an important role in detecting traffic participants. Due to the limited coverage of the angular field of view of a single radar, when the area of a region to be detected is large, a plurality of radars will be placed in different regions so that radar detection can cover the whole area. However, if multiple adjacent radars operate simultaneously, wave interference will inevitably occur. For example, a result obtained based on radar detection may be a false positive (FP) case, which may greatly reduce the accuracy of radar detection and even cause radar "blindness".

SUMMARY

Based on the foregoing background, the present disclosure aims at providing a technical solution that can greatly reduce or completely eliminate the interference between multiple radars.

According to one aspect of the present disclosure, provided is a modulation device for a radar sensor system, wherein the radar sensor system comprises a plurality of groups of radar sensors, and each radar sensor has a serial number corresponding to an order thereof in a group to which the radar sensor belongs. The modulation device is configured to: perform modulation control on the plurality of groups of radar sensors, such that one or more radar sensors in the same group respectively transmit radar signals by different time modulation and radar sensors with corresponding serial numbers in different groups transmit radar signals by the same time modulation.

According to another aspect of the present disclosure, provided is a radar sensor system, comprising: a plurality of groups of radar sensors, each group of radar sensors comprising one or more radar sensors and each radar sensor having a serial number corresponding to an order thereof in the group; and the modulation device described above.

According to still another aspect of the present disclosure, provided is a method of controlling a plurality of groups of radar sensors, each group of radar sensors comprising one or more radar sensors and each radar sensor in each group having a serial number corresponding to an order thereof in the group. The method can be performed by the control unit described above. The method comprises: performing modulation control on the plurality of groups of radar sensors, such that the respective radar sensors in the same group respectively transmit radar signals by different time modulation and radar sensors with corresponding serial numbers in different groups transmit radar signals by the same time modulation.

According to yet another aspect of the present disclosure, provided is a machine-readable storage medium storing executable instructions, which, when executed, cause a processor to perform the method described above.

The above gives the summary of the main aspects of the present disclosure to enable readers to have a basic understanding of these aspects. The summary is not intended to describe key or important elements of all aspects of the present disclosure, or limit the scope of any or all aspects of the present disclosure. The purpose of this summary is to give some implementations of these aspects in a simplified form as the prelude to detailed description that is given below.

DETAILED DESCRIPTION

Embodiments of the present disclosure relate to a radar sensor system based on time modulation and a method of controlling a plurality of groups of radar sensors by grouping radar sensors and performing modulation control on the plurality of groups of radar sensors that are obtained after grouping, such that radar signals transmitted from the respective radar sensors in the same group are asynchronous in time, and radar signals transmitted from the radar sensors with the corresponding serial numbers in different groups are synchronous in time. By means of such modulation control, radar wave interference between multiple radars that operate simultaneously on a road is greatly reduced or even completely eliminated.

The embodiments of the present disclosure are introduced below with reference to the accompanying drawings.

Figure 1:
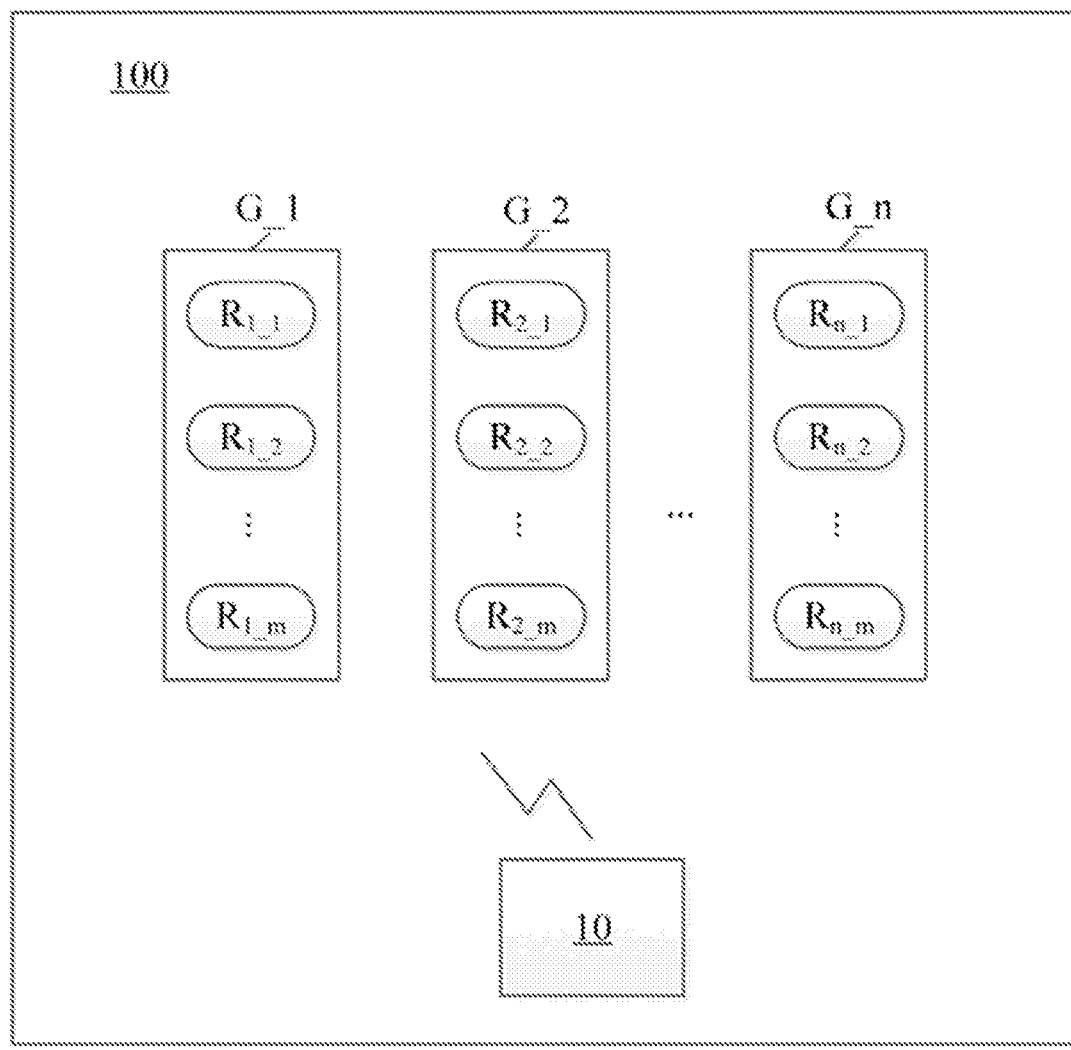
FIG. 1 is a schematic block diagram of a radar sensor system according to an implementation of the present disclosure.

FIG. 1 schematically shows a radar sensor system 100 according to an implementation of the present disclosure, which includes a plurality of groups G_1 to G_n of radar sensors and a modulation device 10. The modulation device 10 is communicatively connected to the plurality of groups of radar sensors, and is used to perform modulation control, based on time modulation, on the plurality of groups of radar sensors. A connection manner between the modulation device 10 and the plurality of groups G_1 to G_n of radar sensors may be wireless communication connection or wired communication connection, or a combination of wireless and wired communication connection.

Each group of radar sensors in the plurality of groups of radar sensors includes one or more radar sensors. For example, as shown in FIG. 1, the first group G_1 of radar sensors includes a plurality of radar sensors $R_{1\_1}$ to $R_{1\_m}$, the second group of radar sensors includes a plurality of radar sensors $R_{2\_1}$ to $R_{2\_m}$, . . . , and the nth group of radar sensors includes a plurality of radar sensors $R_{n\_1}$ to $R_{n\_m}$.

In an embodiment, the respective radar sensors are all frequency-modulated continuous wave radars (FMCW radars). Also, the respective radar sensors have the same maximum detection distance. For example, the radar sensors are FMCW radars of the same model. For each group in the plurality of groups of radar sensors, each radar sensor in the group has a serial number. A serial number of a radar sensor indicates which group the radar sensor belongs to and an order of the radar sensor in the group. In other words, a serial number of a radar sensor may be regarded as a unique identifier of the radar sensor. That is, it can be identified, from a serial number of a radar sensor, which group the radar sensor belongs to and which sensor in the group the radar sensor is. For example, referring to FIG. 1, the radar sensor with the serial number 1_1 refers to the first radar in the first group of radar sensors, the radar sensor with the serial number 1_2 refers to the second radar in the first group of radar sensors, . . . , and the radar sensor with the serial number 1-m refers to the mth radar in the first group of radar sensors.

The radar sensor system in the embodiment of the present disclosure is applicable to a roadside scenario, and may include groups of road traffic radar sensors arranged along a road and/or groups of intersection traffic radar sensors arranged at an intersection. Embodiments regarding the groups of road traffic radar sensors and the groups of intersection traffic radar sensors are introduced below respectively.

Figure 2:
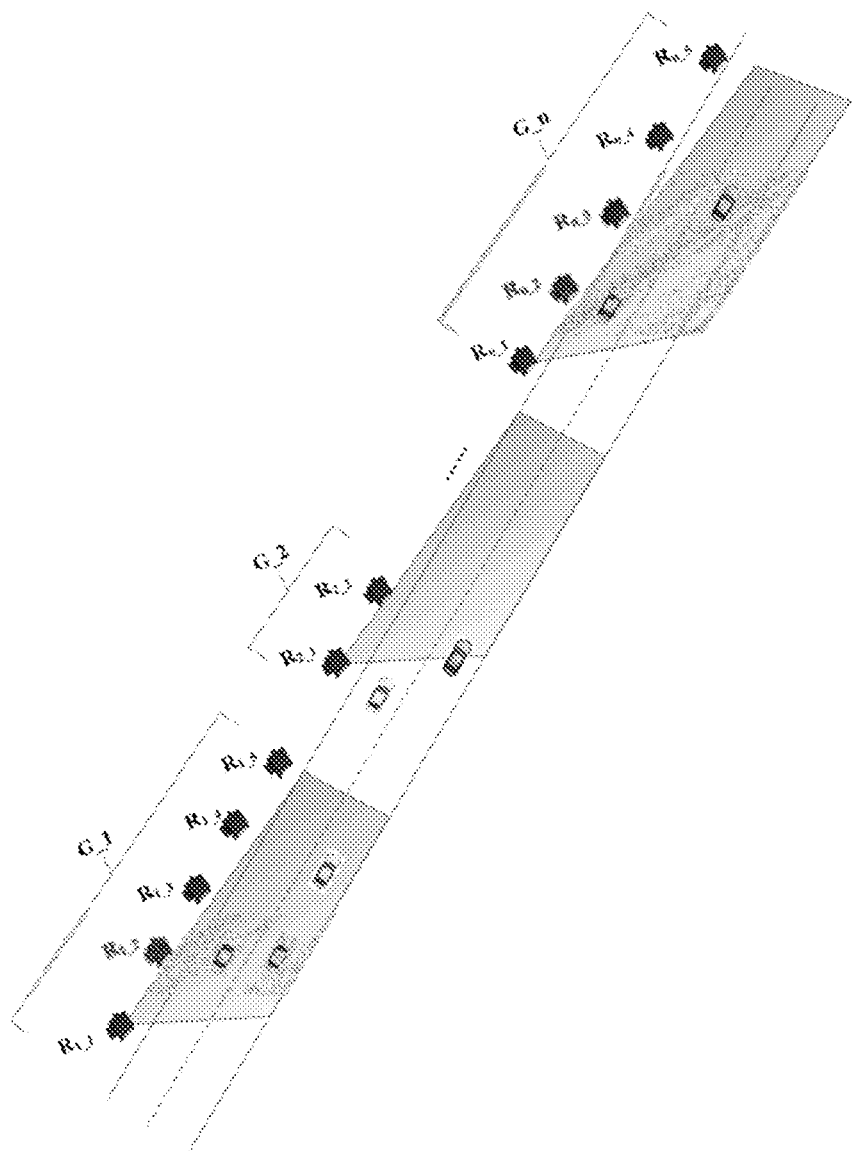
FIG. 2 shows an embodiment of the radar sensor system in FIG. 1.

In an embodiment, the plurality of groups of radar sensors include one or more groups of road traffic radar sensors. Each group of road traffic radar sensors includes one or more radar sensors arranged along a road. In the embodiment, a serial number of each radar sensor in the one or more groups of road traffic radar sensors corresponds to a position thereof on the road. FIG. 2 shows an embodiment of groups of road traffic radar sensors. Referring to FIG. 2, the first group G_1 of radar sensors is a group of road traffic radar sensors, which includes five radar sensors $R_{1\_1}$ to $R_{1\_5}$ sequentially arranged along the road. The second group G_2 of radar sensors is also a group of road traffic radar sensors, which includes two radar sensors $R_{2\_1}$ and $R_{2\_2}$ sequentially arranged along the road.

In the embodiment, the plurality of radar sensors arranged along the road are grouped according to the maximum detection distance of the radar sensors. Specifically, the maximum distance of a group of road traffic radar sensors along a road, namely, the distance between the first radar sensor and the last radar sensor in the group, is less than the maximum detection distance of the radar sensors, and the distance between the first radar sensor in the group and the first radar sensor in the next group is greater than the maximum detection distance of the radars. Such an arrangement is beneficial because for each group of road traffic radar sensors, the road range within the group can be fully covered, without affecting radar detection of the next group.

The foregoing arrangement is illustrated by taking the first and second groups of road traffic radar sensors shown in FIG. 2 as an example. Referring to FIG. 2, the distance between the first radar sensor $R_{1\_1}$ and the last radar sensor $R_{1\_5}$ in the first group G_1 of road traffic radar sensors is the maximum distance of the first group of road traffic radar sensors along the road, the maximum distance is less than the maximum detection distance of the radar sensors, and the distance between the first radar sensor $R_{1\_1}$ in the first group G_1 of radar sensors and the first radar sensor $R_{2\_1}$ in the second group G_2 of radar sensors is greater than the maximum detection distance of the radars.

It can be understood that, in the case where the maximum detection distances of radar sensors in a group are equal, the "maximum detection distance" may be a detection distance of any radar sensor. In the case where a plurality of radar sensors existing in a group have different maximum detection distances, the "maximum detection distance" may be the largest distance in the different maximum detection distances.

Figure 3:
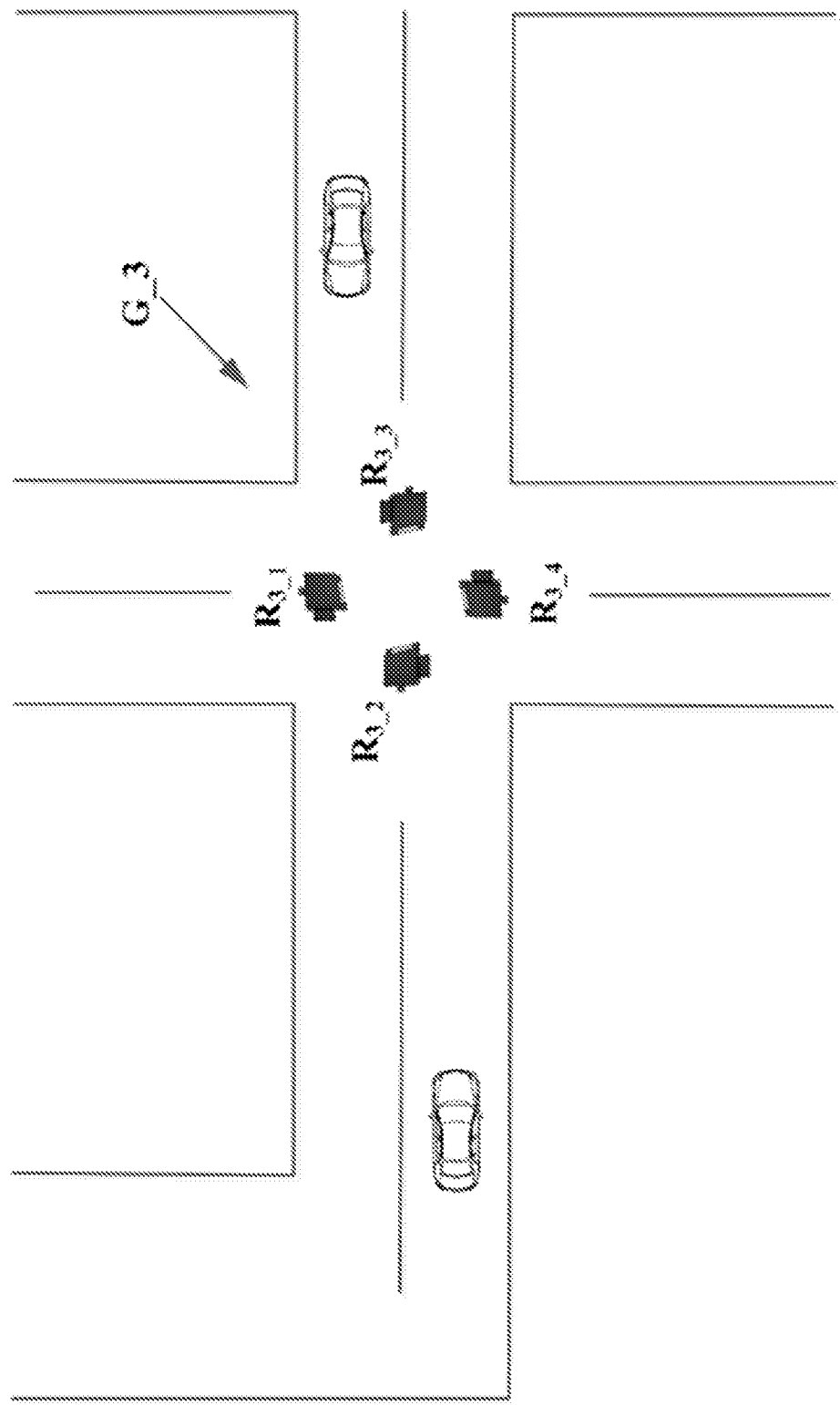
FIG. 3 is another embodiment of the radar sensor system in FIG. 1.

In another embodiment, the plurality of groups of radar sensors include one or more groups of intersection traffic radar sensors. Each group of intersection traffic radar sensors includes one or more radar sensors arranged at an intersection. In the embodiment, a serial number of each radar sensor in the intersection traffic radar sensor group corresponds to a direction (position and orientation) thereof at the intersection. FIG. 3 shows an embodiment of groups of intersection traffic radar sensors. Referring to FIG. 3, the third group G_3 of radar sensors is a group of intersection traffic radar sensors, which includes four radar sensors $R_{3\_1}$ to $R_{3\_4}$ that are arranged at the same intersection with different orientations.

It should be noted that, the radar sensor system 100 according to the embodiments of the present disclosure may include groups of road traffic radar sensors and/or groups of intersection traffic radar sensors. In other words, the sensor system 100 may include a plurality of groups of road traffic radar sensors arranged along a road, or a plurality of groups of intersection traffic radar sensors arranged at different intersections, or a plurality of groups of road traffic radar sensors and a plurality of groups of intersection traffic radar sensors. The grouping and arrangement of the radar sensor system 100 in the embodiments of the present disclosure may be determined according to a specific roadside scenario (for example, a road type, a road traffic direction, an intersection type, or the like).

The modulation device 10 performs modulation control on the plurality of groups of radar sensors, and may be implemented by software, hardware, or a combination of software and hardware. The modulation device 10 may be disposed in an edge server or a central control device on the roadside, and may also be disposed in a cloud server.

The principle and process of modulation control performed by the modulation device 10 are introduced below.

The modulation device 10 performs time modulation on radar signals emitted by the plurality of groups of radar sensors, such that the respective radar sensors in the same group transmit radar signals by different time modulation and the radar sensors with corresponding serial numbers in different groups transmit radar signals by the same time modulation. For example, by taking the first and second groups of radar sensors as an example, based on the foregoing time modulation results, timings of emitting radar signals by the respective radar sensors in the first group G_1 of radar sensors are different. Also, timings of emitting radar signals by the radar sensors with the corresponding serial numbers in the first and second groups of radar sensors are the same. That is, the first radar sensor in the first group emits radar signals at the same timing as the first radar sensor in the second group, and the second radar sensor in the first group emits radar signals at the same timing as the second radar sensor in the second group.

The time modulation principle of the modulation device 10 is introduced below with reference to FIG. 4.

Figure 4:
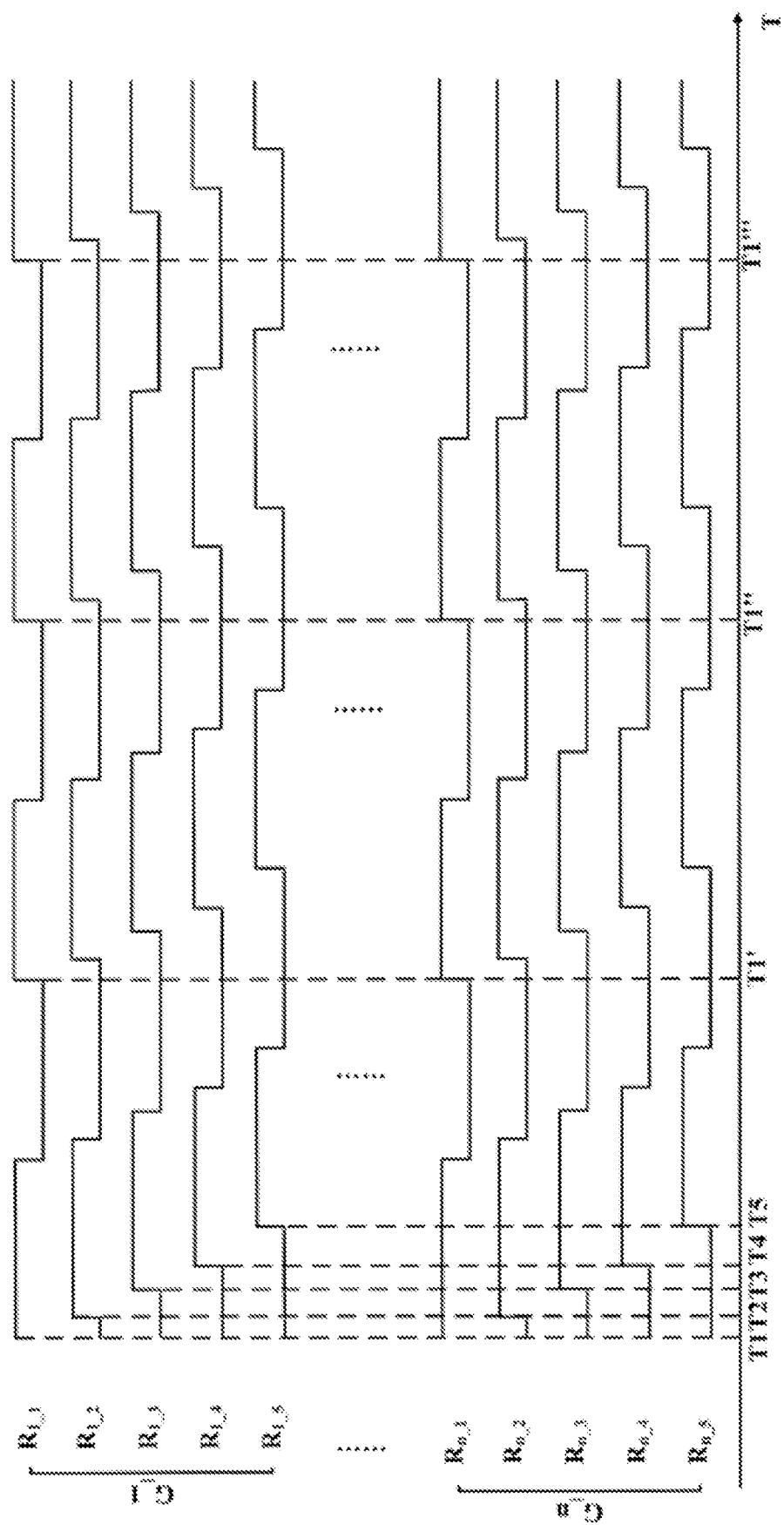
FIG. 4 shows an operating principle of the radar sensor system in FIG. 1.

Referring to FIG. 4, the abscissa indicates time, and each drawn line indicates the timing of a radar signal transmitted by a radar sensor. A "high" time segment of each line indicates a time segment in which a radar sensor emits a radar signal, and a "low" time segment indicates a time segment in which the radar sensor receives a radar signal or does not transmit a radar signal. It can be obtained from FIG. 4 that, according to the foregoing time modulation result, the respective radar sensors in the same radar sensor group transmit radar signals asynchronously in time. For example, the starting time points at which the five radar sensors $R_{1\_1}$ to $R_{1\_5}$ din the first group $G\_1$ transmit radar signals in each cycle are different, with reference to the time points T1 to T5 in FIG. 4. Also, it can be further obtained from FIG. 4 that, according to the foregoing time modulation result, the radar sensors with corresponding serial numbers in different radar sensor groups transmit radar signals synchronously in time. For example, the starting time point at which the first radar sensor in the nth group emits a radar signal in each cycle is the same as the starting time point at which the first radar sensor in the first group emits a radar signal in each cycle.

The result of time modulation by the modulation device 10 can be duplicated. In an embodiment, the modulation device 10 may first perform modulation control on a group of radar sensors comprising a maximum number of radar sensors, so as to allocate a radar signal transmission timing for each radar sensor in the group. Then, the time modulation result for the group is duplicated to other groups. For example, it is assumed that the first group of radar sensors comprises a maximum number of radar sensors, which is five. The modulation device 10 first performs modulation control on the first group of radar sensors, so as to determine a signal transmission timing for each radar sensor in the first group. Then, the time modulation result for the first group is duplicated to the third group of radar sensors. Assuming that the third group includes four radar sensors, the modulation device 10 duplicates time modulation results for the first to fourth radar sensors in the first group to the first to fourth radar sensors in the third group respectively, such that the first to fourth radar sensors in the third group have the same transmitting timings of transmitting radar signals as those of the first to fourth radar sensors in the first group respectively and the timings of transmitting radar signals are respectively the same.

In an embodiment, the modulation device 10 performs modulation control on respective radar sensors in the plurality of groups of radar sensors, such that the radar signals transmitted by the respective radar sensors in the same group have different frequency modulation sequences and the radar signals transmitted by the radar sensors with corresponding serial numbers in different groups have the same frequency modulation sequences. For example, by taking the first and second groups of radar sensors as an example, based on the foregoing frequency modulation result, the respective radar sensors in the first group $G\_1$ of radar sensors respectively transmit radar signals in different frequency modulation sequences in time segments for radar signal transmission (for example, time segments with "high" lines for $R_{1\_1}$ to $R_{1\_5}$ in FIG. 4) based on the time modulation result. Also, the radar sensors with the corresponding serial numbers in the first and second groups of radar sensors transmit radar signals in the same frequency modulation sequences. For example, the first radar sensor in the first group and the first radar sensor in the second group transmit radar signals in the same frequency modulation sequences in the time segments for radar signal transmission based on the time modulation result.

Figure 5:
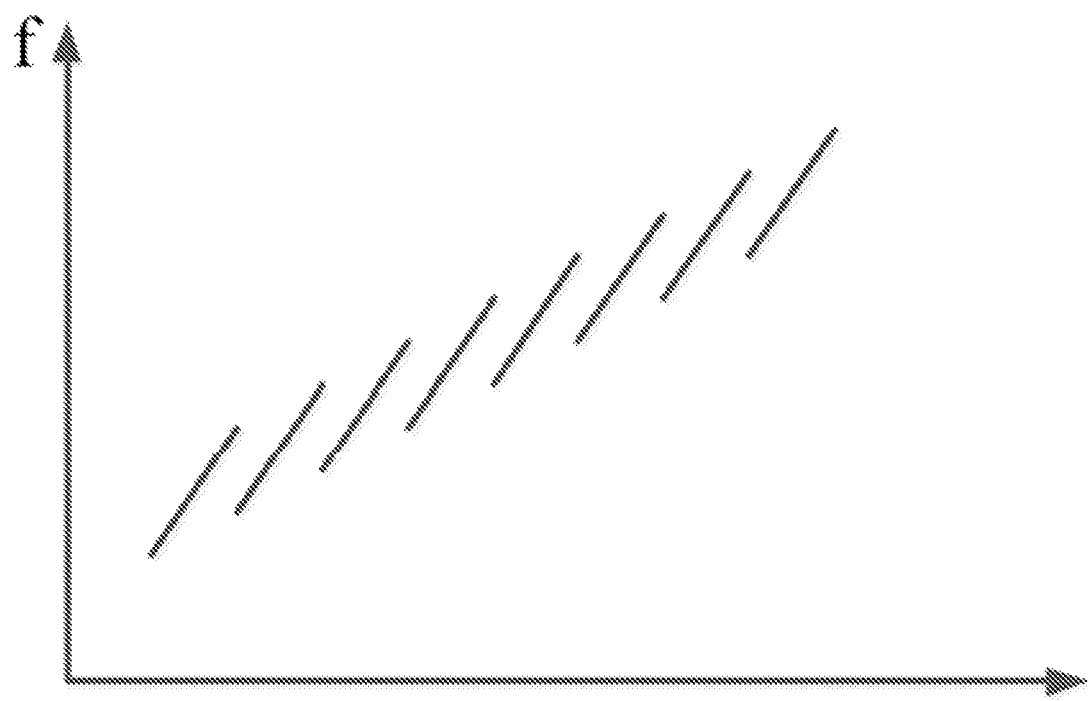
FIG. 5 is a schematic diagram of frequency modulation ramp sequences of transmitted radar signals in an embodiment of the present disclosure.

FIG. 5 shows frequency modulation sequences according to an embodiment of the present disclosure. For example, the modulation device 10 modulates the transmitted radar signals with the frequency ramp sequences shown in FIG. 5. It can be understood that, the same frequency modulation sequences should have the same slope and offset (Hub). Different frequency modulation sequences may have different slopes and/or offsets.

In an embodiment, each radar sensor includes a controllable oscillator and an antenna element. The controllable oscillator generates the frequency modulation sequence under the modulation control by the modulation device 10 and emits a radar signal having the frequency modulation sequence via the antenna element. In the embodiment, the controllable oscillator may be a voltage-controlled oscillator (VCO). The modulation device 10 controls the oscillation frequency of the voltage-controlled oscillator by means of an external voltage. For example, the modulation device 10 outputs a voltage signal to the voltage-controlled oscillator of each radar sensor, so as to modulate and control the frequency sequence generated by the voltage-controlled oscillator. By such a modulation control, radar signals transmitted from the respective radar sensors in the same group respectively have different frequency modulation sequences, and radar sensors with the corresponding serial numbers in different groups have the same frequency modulation sequences.

Additionally, the modulation device 10 further controls the radar sensors to transmit radar signals with the same cycle, and the cycle is, for example, a processing cycle of a processor (e.g., a DSP) for processing a radar signal. Also, a maximum value of the number of radar sensors comprised in each group of radar sensors is limited. The maximum number of radar sensors comprised in a group of radar sensors is the maximum number of radar signals with different frequency sequences that can be modulated in the processing cycle. For example, if at most five different frequency sequences can be modulated in one processing cycle, each group in the plurality of groups of radar sensors comprises five radar sensors at most. Definitely, a case where a group comprises less than five radar sensors, for example 4, 3, 2, or 1 sensor, is also possible.

It can be understood that, the number of radar sensors comprised in each of the plurality of groups of radar sensors may be the same or different. For example, referring to FIG. 2, the first group of radar sensors includes five radar sensors, and the second group of radar sensors includes two radar sensors.

Figure 6:
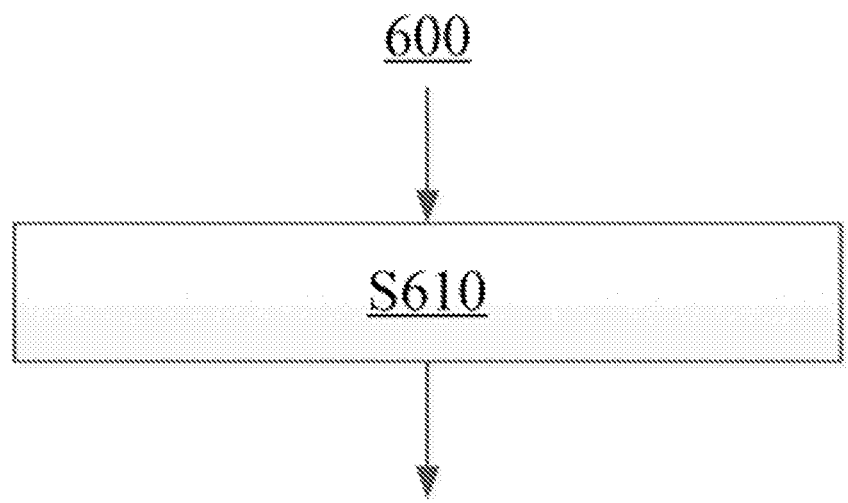
FIG. 6 is a flowchart of a method of controlling a plurality of groups of radar sensors according to an implementation of the present disclosure.

FIG. 6 shows a flowchart of a method 600 of controlling a plurality of groups of radar sensors according to an implementation of the present disclosure. The method 600 can be implemented by the foregoing system 100 and the foregoing modulation device 10, and thus the above descriptions about the system 100 and the modulation device 10 are also applicable here.

Referring to FIG. 6, in step S610, the modulation device 10 performs modulation control on each radar sensor in the plurality of groups of radar sensors, such that the respective radar sensors in the same group respectively transmit radar signals by different time modulation and radar sensors with corresponding serial numbers in different groups transmit radar signals by the same time modulation.

The present disclosure further provides a machine-readable storage medium storing executable instructions, which, when executed, cause one or more processors to perform the foregoing method 600.

It can be understood that, the modulation device 10 may be implemented by hardware, software, or a combination of software and hardware. As for the part implemented by hardware, it may be implemented in one or more application-specific integrated circuits (ASICs), digital signal processors (DSPs), programmable logic devices (PLDs), field-programmable gate arrays (FPGAs), processors, controllers, microcontrollers, microprocessors, electronic units designed to perform the functions thereof, or combinations thereof. As for the part implemented by software, it may be implemented by means of microcode, program code or code segments, or may also be stored in a machine-readable storage medium such as a storage component.

It can be appreciated that the processor may be implemented using electronic hardware, computer software, or any combination thereof. Whether these processors are implemented as hardware or software depends on a specific application and overall design constraints imposed on the system. As an example, the processor, any part of the processor, or any combination of the processor given in the present disclosure may be implemented as a microprocessor, a microcontroller, a digital signal processor (DSP), a field-programmable gate array (FPGA), a programmable logic device (PLD), a state machine, gate logic, a discrete hardware circuit, or other suitable processing components configured to perform the various functions described in the present disclosure. The functions of the processor, any part of the processor, or any combination of the processor given in the present disclosure may be implemented as software executed by a microprocessor, microcontroller, DSP or other suitable platforms.

Although some embodiments have been described above, these embodiments are given by way of examples only, and are not intended to limit the scope of the present disclosure. The appended claims and their equivalents are intended to cover all modifications, substitutions and changes made within the scope and purpose of the present disclosure.

What is claimed is:

1. A modulation device for a radar sensor system, the radar sensor system including a plurality of groups of radar sensors, each radar sensor having a serial number corresponding to an order thereof in a group to which the radar sensor belongs, the modulation device being configured to:
   perform modulation control on the plurality of groups of radar sensors, such that (i) each radar sensor is modulated with a different time modulation and a different frequency modulation sequence compared to each other radar sensor in a same group of radar sensors, and (ii) each radar sensor is modulated with a same time modulation and a same frequency modulation sequence as to each other radar sensor having corresponding serial numbers of a same order within a different group of radar sensors.

2. The modulation device according to claim 1, the modulation device being further configured to:
   transmit a voltage signal to respective radar sensors in the plurality of groups of radar sensors so as to control the frequency modulation sequences generated by the respective radar sensors.

3. The modulation device according to claim 1, the modulation device being further configured to:
   perform modulation control on respective radar sensors in the plurality of groups of radar sensors, such that the respective radar sensors emit the radar signals with a same cycle.

4. The modulation device according to claim 3, wherein the cycle is a machine cycle of a processor that processes the radar signals.

5. The modulation device according to claim 1, the modulation device being further configured to:
   perform modulation control on a group of sensors in the plurality of groups of radar sensors having a maximum number of radar sensors; and
   duplicate, after performing the modulation control, a time modulation result for the group of sensors to other groups of sensors in the plurality of groups, such that radar sensors with corresponding serial numbers in different groups transmit radar signals by the same time modulation.

6. The modulation device according to claim 1, where the different time modulation of each radar sensor partially overlaps with a time modulation of another radar sensor in the same group.

7. The modulation device according to claim 1, where the different frequency modulation sequence of each radar sensor partially overlaps with a frequency modulation sequence of another radar sensor in the same group.

8. A radar sensor system comprising:
   a plurality of groups of radar sensors, each respective group of radar sensors including at least one radar sensor and each radar sensor in the respective group having a serial number corresponding to an order thereof in the respective group; and
   a modulation device configured to perform modulation control on the plurality of groups of radar sensors, such that (i) each radar sensor is modulated with a different time modulation and a different frequency modulation sequence compared to each other radar sensor in a same group of radar sensors, and (ii) each radar sensor is modulated with a same time modulation and a same frequency modulation sequence as to each other radar sensor having corresponding serial numbers of a same order within a different group of radar sensors.

9. The radar sensor system according to claim 8, each respective radar sensor in the plurality of groups of radar sensors comprising:
   a controllable oscillator and an antenna element, the controllable oscillator being configured to generate a frequency modulation sequence under the modulation control by the modulation device and emit a radar signal having the frequency modulation sequence via the antenna element.

10. The radar sensor system according to claim 9, wherein the controllable oscillator is a voltage-controlled oscillator (VCO), and the modulation device controls the frequency modulation sequence generated by the voltage-controlled oscillator by transmitting a voltage signal to the voltage-controlled oscillator of the respective radar sensor.

11. The radar sensor system according to claim 8, wherein:
   a maximum number of radar sensors in a group of radar sensors in the plurality of groups of radar sensors is a maximum number of radar signals with different frequency modulation sequences that can be modulated in a cycle; and
   the cycle is a machine cycle of a processor that processes the radar signals.

12. The radar sensor system according to claim 8, wherein each radar sensor in the plurality of groups of radar sensors is a frequency-modulated continuous wave (FMCW) radar sensor.

13. The radar sensor system according to claim 8, wherein the plurality of groups of radar sensors includes at least one group of road traffic radar sensors, each of the at least one group of road traffic radar sensors including at least one radar sensor arranged along a road and a serial number of each radar sensor therein corresponds to a position thereof.

14. The radar sensor system according to claim 13, wherein for each respective group of the at least one group of road traffic radar sensors, a distance between a first radar sensor in the respective group and a last radar sensor in the respective group is less than a maximum detection distance of the radar sensors, and a distance between the first radar sensor in the respective group and a first radar sensor in a next group is greater than the maximum detection distance.

15. The radar sensor system according to claim 8, wherein the plurality of groups of radar sensors includes at least one group of intersection traffic radar sensors, each of the at least one group of intersection traffic radar sensors including at least one radar sensor arranged at an intersection, a serial number of each radar sensor in the at least one group of intersection traffic radar sensor corresponding to a direction thereof at the intersection.

16. A method of modulating a plurality of groups of radar sensors, each respective group of radar sensors including at least one radar sensor and each radar sensor in the respective group having a serial number corresponding to an order thereof in the respective group, the method comprising:
performing modulation control on the plurality of groups of radar sensors, such that (ii each radar sensor is modulated with a different time modulation and a different frequency modulation sequence compared to each other radar sensor in a same group of radar sensors, and (ii) each radar sensor is modulated with a same time modulation and a same frequency modulation sequence as to each other radar sensor having corresponding serial numbers of a same order within a different group of radar sensors.

17. The method according to claim 16, wherein the method is performed by executing executable instructions stored on non-transitory a machine-readable storage medium.

18. The method according to claim 16, wherein the method is performed by a control unit.

* * * * *